United States Patent
Maree

(10) Patent No.: US 6,592,246 B2
(45) Date of Patent: Jul. 15, 2003

(54) METHOD AND INSTALLATION FOR FORMING AND MAINTAINING A SLURRY

(75) Inventor: Johannes Phillippus Maree, Gauteng (ZA)

(73) Assignee: CSIR, Pretoria (ZA)

( * ) Notice: Subject to any disclaimer, the term of this patent is extended or adjusted under 35 U.S.C. 154(b) by 0 days.

(21) Appl. No.: 09/941,886

(22) Filed: Aug. 28, 2001

(65) Prior Publication Data

US 2002/0104805 A1 Aug. 8, 2002

(30) Foreign Application Priority Data

Aug. 28, 2000 (ZA) .......................................... 2000/4450

(51) Int. Cl.$^7$ ............................................... B01F 15/02
(52) U.S. Cl. .................... 366/132; 366/136; 366/153.1; 366/160.2; 366/183.1
(58) Field of Search ................................ 366/132, 134, 366/136, 137, 151.1, 152.1, 152.4, 153.1, 160.1, 160.2, 162.1, 179.1, 181.1, 183.1

(56) References Cited

U.S. PATENT DOCUMENTS

| 3,830,473 A | * | 8/1974 | Lieferman et al. |
| 4,820,053 A | * | 4/1989 | Rivers |
| 5,114,239 A | * | 5/1992 | Allen |
| 5,769,536 A | * | 6/1998 | Kotylak |
| 5,951,161 A | * | 9/1999 | Blagg |

FOREIGN PATENT DOCUMENTS

| JP | 55-41351 | * | 3/1980 |

* cited by examiner

*Primary Examiner*—Charles E. Cooley
(74) *Attorney, Agent, or Firm*—Klarquist Sparkman, LLP

(57) ABSTRACT

A method and installation for forming and maintaining a slurry are disclosed. The method withdraws a slurry from a reservoir and directs it at a heap of solid material from which the slurry is drained into the reservoir, the slurry containing additional solid material from the heap to increase its specific gravity. The volume of slurry in the reservoir and its specific gravity are controlled. The installation comprises a support having a support surface which slopes to permit slurry to drain therefrom A reservoir receives slurry draining from the support and has a liquid feed. A pump withdraws the slurry from the reservoir and pumps it to a spray nozzle for spraying slurry at a heap of material on the support.

21 Claims, 2 Drawing Sheets

METHOD AND INSTALLATION FOR FORMING AND MAINTAINING A SLURRY

FIELD OF THE INVENTION

Figure 1:
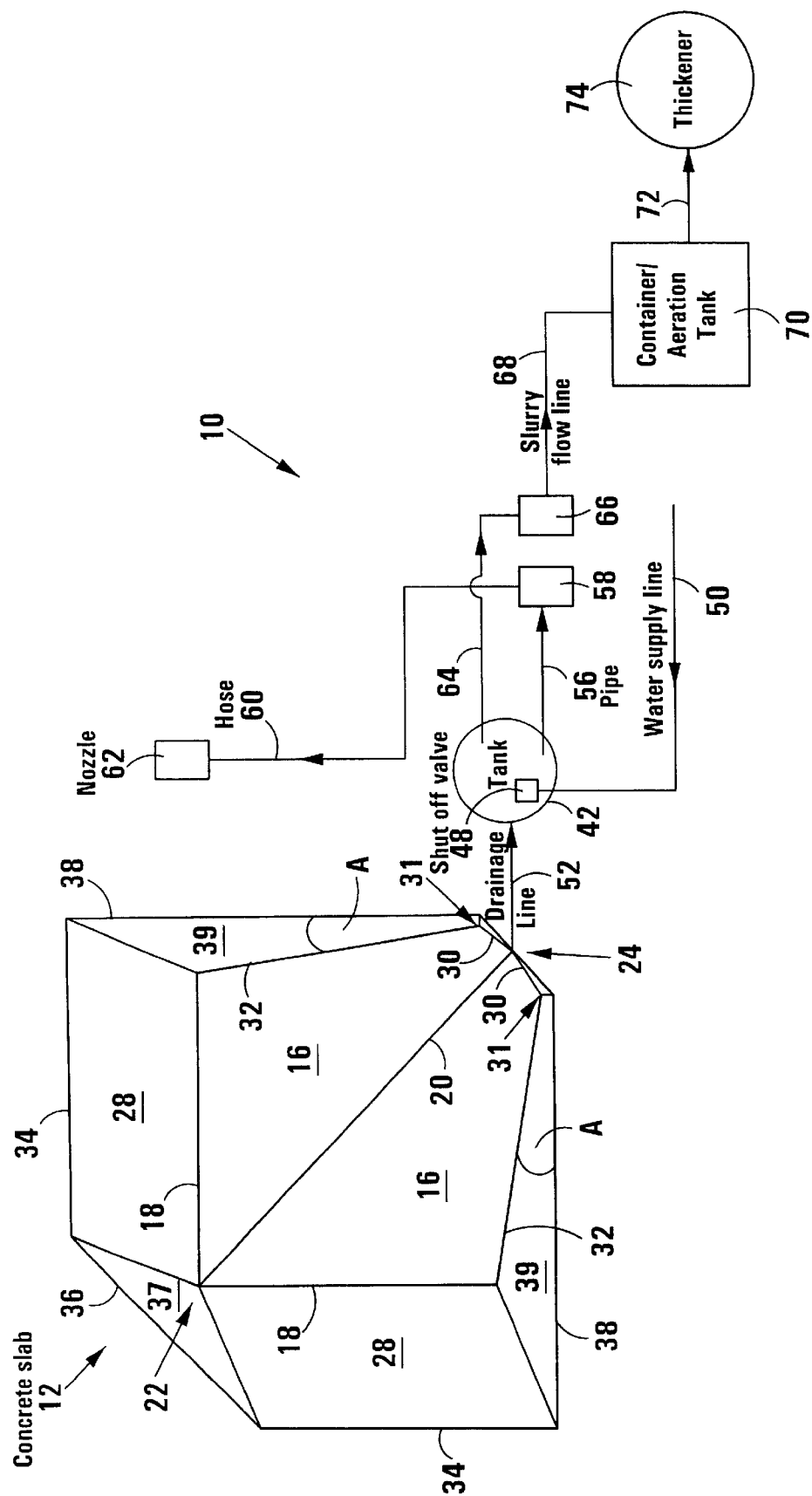

THIS INVENTION relates to slurries. More particularly, the invention relates to a method and to an installation for forming and maintaining, for consumption, a stock of slurry.

SUMMARY OF THE INVENTION

According to one aspect of the invention there is provided a method of forming and maintaining for consumption a stock of slurry derived from a liquid and from a particulate solid material, the method including the steps of:

withdrawing a slurry of the liquid and the solid material from a stock of the slurry in a reservoir;

directing a stream of the liquid or of the withdrawn slurry at a bulk supply of the solid material in the form of a heap of the solid material, and on to the solid material of the heap;

allowing the stream directed at the heap to drain under gravity from the heap into the reservoir, the stream, while draining from the heap, entraining therein solid material from the heap to increase the specific gravity of the stream and to carry solid material from the heap into the stock of slurry in the reservoir to increase the specific gravity thereof; and feeding liquid to the reservoir to maintain the volume of the slurry in the reservoir, the method including controlling both the volume of slurry in the reservoir and the specific gravity of the slurry in the reservoir, the feeding of the liquid into the reservoir being initiated, or having its feed rate increased, in response to decreases in the volume of the slurry in the reservoir associated with withdrawal of slurry from the reservoir for consumption thereof, and the directing of the stream at the heap of solid material being initiated, or having its flow rate increased, in response to decreases in the specific gravity of the slurry in the reservoir associated with feeding the liquid to the reservoir, thereby both to maintain the volume of slurry in the reservoir at a desired value, and to maintain the specific gravity of the slurry in the reservoir at a desired value, the feeding of liquid to the reservoir being reduced in rate or discontinued when the desired slurry volume is regained, and the directing of the stream at the heap being reduced in rate or discontinued when the desired specific gravity value is regained.

It will be appreciated that increases and decreases to the specific gravity of the slurry are associated respectively with increases and decreases to the solids content thereof.

While it is in principle possible to carry out the method by directing a stream of the liquid at and on to the solid material of the heap, to form a slurry having a solids content and specific gravity greater than the solids content and specific gravity respectively of the slurry in the reservoir, to permit drainage of a slurry from the heap into the reservoir which increases the solids content and specific gravity of the slurry in the reservoir, it is preferable to employ slurry withdrawn from the reservoir for this purpose. The stream directed at the heap may thus be a stream of the slurry withdrawn from the reservoir.

The method of the invention contemplates that withdrawal of slurry from the reservoir for consumption thereof may be continuous or intermittent, and that the liquid feed to the reservoir, which may be continuous or intermittent, will be at a rate such that the volume of slurry in the reservoir is maintained at the desired value when slurry is withdrawn for consumption at any rate up to the maximum intended rate. Similarly, the withdrawal of the stream of slurry from the reservoir to direct at the heap, which withdrawal may also be continuous or intermittent, will in turn be at a rate such that the specific gravity of the slurry in the reservoir is maintained at the desired value when the slurry is withdrawn for consumption at any rate up to the maximum intended withdrawal rate for consumption. Thus, the desired volume of the slurry, at least on average and with no more than acceptable departures from the desired value, can be maintained in the reservoir while the specific gravity, ie the density or solids content, of the slurry is likewise maintained, at least on average and with no more than acceptable departures from the desired value. In a particular embodiment of the invention, when the stream directed at the heap is a stream of slurry withdrawn from the reservoir, the liquid feed to the reservoir may be intermittent, being at a fixed rate no less than the maximum rate at which the slurry is withdrawn from the reservoir for consumption, the stream directed at the heap being withdrawn from the reservoir intermittently and at a fixed rate.

In a further particular embodiment of the invention the liquid may be water, the solid material being particulate or powdered limestone, or possibly dolomite. In other words, the liquid may be water, the solid material being selected from the group consisting of limestone, dolomite and mixtures thereof.

The controlling of the volume of slurry in the reservoir may be automatic, being by controlling the depth of slurry in the reservoir by means of a valve, the valve being selected from the group consisting of ultra-violet (UV)-controlled valves and, preferably, float-controlled valves and the valve controlling the liquid feed to the reservoir. Similarly, controlling the specific gravity of the slurry in the reservoir may be automatic, for example by using one or more load cells on which the reservoir is supported, to measure the mass of the reservoir, or by using one or more pressure cells in the interior of the reservoir to measure the static pressure in the reservoir, said cell or cells controlling the withdrawal of the stream of liquid from the reservoir which is directed at the heap. In other words, the controlling of the specific gravity of the slurry in the reservoir may be automatic, being by using a cell selected from load cells which measure the mass of the reservoir and pressure cells which measure static pressure in the reservoir, to control the directing of the stream at the heap. The liquid feed to the reservoir or the slurry stream withdrawal from the reservoir may be provided with on/off flow control, and/or they may incorporate variation of their flow rates in response to the magnitude of any departure of the slurry volume or specific gravity from the respective desired values thereof.

Indeed, instead of using load cells or pressure cells, the reservoir can in principle float in a body of water, the depth at which the reservoir floats in the body of water being related to the mass of the reservoir and hence to the specific gravity of the slurry therein, changes in this depth being used to control the directing of the stream at the heap, although it is expected that use of load cells or pressure cells will be preferred.

The method may involve agitation of the slurry in the reservoir to promote maintenance of the solid material in suspension in the liquid and to resist its settling out from the liquid, and the method may include replenishing the bulk supply of particulate material in the heap, as and when required, e.g. intermittently by means of vehicles loaded therewith Withdrawal of slurry from the reservoir, either as a stream to be directed at the heap, or for consumption thereof, may be by pumping it, and directing the stream of slurry at the heap may be by spraying it, e.g. from one or more spray nozzles at the ends of respective hoses, which may be hand-held. In particular, the method may include the step of agitating the slurry to promote maintenance of the solid in suspension in the liquid, withdrawal of slurry from the reservoir being by pumping, directing the stream at the heap being by spraying it from one or more hand-held nozzles, and feeding the liquid to the reservoir being by directing it at the heap.

If desired, the method may make provision for the removal of stones and/or grit from the slurry, between the reservoir and the hose or hoses, e.g. by passing the slurry upwardly through an inverted-conical tank, the slurry from the reservoir being fed into the tank at a low level where its diameter is small, and the slurry issuing from the tank at a high level where its diameter is large, the tank shape and size and the slurry flow rate being selected to promote retention of stones and grit in the tank, while an overflow from the tank takes the place of slurry containing particles of acceptably small size, and stones and grit are removed, e.g. intermittently from the lower parts of the tank; and slurry can, if desired, be recirculated from the top of the tank to its bottom, to achieve upward flow rates in the tank which keep small slurry particles in suspension.

The feeding of the liquid to the reservoir to maintain the volume of slurry in the reservoir may be directly from a liquid supply into the reservoir, or it may be indirect, the liquid being fed from the liquid supply into the stream of slurry which is directed at the bulk supply, so that the liquid enters the reservoir as part of the slurry draining into the reservoir According to another aspect of the invention there is provided an installation for forming and maintaining, for consumption, a stock of slurry derived from a liquid and from a bulk supply of particulate solid material, the installation including;

a support having an upwardly facing support surface for supporting a heap of particulate solid material, the support surface sloping so that it is inclined to the horizontal to permit a slurry of liquid and particulate solid material to drain under gravity therefrom;

a reservoir arranged to receive slurry draining under gravity from the support surface of the support and to hold a stock of slurry;

a liquid feed for feeding liquid to the reservoir;

a slurry withdrawal device for withdrawing slurry from a stock of slurry in the reservoir;

a spray device for spraying a liquid or slurry at a heap of particulate material supported on the support and on to the particulate material of the heap;

a volume control device for controlling the volume of the stock of slurry in the reservoir and operative, in response to a decrease in said volume below a desired value, to initiate, or increase the rate of, the feeding of liquid by the liquid feed to the reservoir; and a specific gravity control device for controlling the specific gravity of the stock of slurry in the reservoir and operative, in response to a decrease in said specific gravity below a desired value, to initiate, or increase the rate of, the spraying of the liquid or slurry at the heap, the volume control device being operative to discontinue, or to reduce the rate of feeding of, liquid to the reservoir, when the desired volume is regained and the specific gravity control device being operative to discontinue, or to reduce the rate of spraying of, the liquid or slurry at the heap, when the desired specific gravity is regained.

The support may be a cementitious, e.g. concrete, slab resting on the ground and having a shaped support surface for supporting the heap, the support surface having, for example, two flat portions which slope and converge downwardly to meet at a line of intersection therebetween, which line in turn slopes downwardly towards a drainage point where the support surface drains into the reservoir. The slab may have a pair of ramps, respectively sloping upwardly from ground level to peripheral edges of the flat portions of the support surface, to facilitate the tipping of particulate material from load vehicles on to the support surface. In a particular embodiment of the installation, the support may thus be a slab of cementitious material having a shaped support surface for supporting the heap, the support surface sloping downwardly to a drainage point and the slab being provided with a vehicle ramp leading upwardly from ground level to a peripheral edge of the slab, which edge is raised above ground level, the reservoir being a completely mixed tank located below the level of the drainage point and provided with a stirrer in its interior.

The reservoir may in turn be in the form of an opentopped completely mixed tank, located in a pit below ground level, at a position where the support surface can drain under gravity into the open top of the tank, and having a stirrer in its interior.

The slurry withdrawal device may be a pump. The pump for withdrawal of slurry for consumption may simply feed into a pipe or similar flow line; and there may be a further similar pump for withdrawal of a stream of slurry to be directed at the heap, which further pump may feed Into one or more hoses, each optionally provided with a spray nozzle at its free end. Thus, the spray device may comprise one or more hoses, each of which has a free end provided with a spray nozzle.

The volume control device may be in the form of a liquid level control means and may thus be an ultra-violet (UV)-controlled valve or preferably a float-controlled valve controlling feeding of liquid from the liquid feed, which may be a pipe, into the reservoir, the valve conveniently being a shut-off or on-off valve arranged to open fully and permit feeding of liquid at a fixed rate into the reservoir if the level of slurry in the reservoir decreases below a desired value, equivalent to the desired slurry volume in the tank, and to shut off liquid flow from the pipe when said desired level is regained. Accordingly, the volume control device may be a shut-off valve selected from the group consisting of ultra-violet (UV)-controlled valves and float-controlled valves, the shut-off valve being arranged to open if the level of slurry in the reservoir decreases below a desired value and to close when said desired value is regained.

The specific gravity control device may be one or more load cells on which the tank is supported in the pit, arranged to control withdrawal of the stream of slurry from the tank by automatically starting the associated pump, or increasing its pumping rate, when the mass of the tank and the desired volume of slurry in the tank contents decreases below a predetermined value corresponding to the desired specific gravity, and arranged automatically to discontinue the pumping, or reduce its rate, when the predetermined value is regained Thus, generally, the specific gravity control device may comprise at least one cell selected from the group consisting of load cells on which the reservoir is supported for sensing the mass of the reservoir, and pressure cells in the interior of the reservoir for sensing static pressure in the reservoir, the cell being operatively connected to a shut-off valve for supplying liquid or slurry to the spray device.

In this regard it will be appreciated that spraying slurry on to the heap and allowing it to drain under gravity into the tank while entraining particulate solid material from the heap, will increase the concentration of solid material in the slurry in the tank and hence will increase the mass of the slurry and hence will increase the total mass of the tank and its contents when filled with the desired volume of slurry. Correspondingly, feeding liquid into the tank will dilute the slurry and reduce the mass of the slurry and hence reduce the total mass of the tank and its contents when filled with slurry to the desired volume or level. Withdrawal of slurry from the tank for consumption leads to feeding liquid into the tank and to a decrease in specific gravity of the slurry, which in turn leads to spraying of slurry on to the heap and washing solid material from the heap into the tank, thereby causing a compensatory increase in specific gravity. Thus, both the volume or level of slurry in the tank, and its specific gravity, can automatically be maintained.

Instead of comprising one or more load cells, the specific gravity control device may comprise one or more pressure cells in the tank, e.g. at or near its bottom, arranged to control the withdrawal of the stream of slurry from the tank by automatically starting the associated pump, or increasing its pumping rate, when the pressure sensed by the pressure cells decreases below a predetermined value corresponding to the desired specific gravity, the pressure cells being arranged automatically to discontinue the pumping, or to reduce its rate, when the sensed pressure regains its predetermined value. In this regard it will be appreciated that the pressure exerted by the slurry, at a particular depth, is directly related to the specific gravity of the slurry which in turn is, directly related to the solids concentration in the slurry. The pressure cell or cells are thus functionally equivalent to the load cell or cells, the cell or cells in question in each case being, for example, electrically connected to a switch or pump flow control means for switching the associated pump on or off or for controlling its pumping rate, which pump is thus conveniently electrically driven. In particular, the specific gravity control device may comprise at least one cell selected from the group consisting of load cells on which the reservoir is supported for sensing the mass of the reservoir, and pressure cells in the interior of the reservoir for sensing static pressure in the reservoir, the cell being operatively connected to a shut-off valve for supplying liquid or slurry to the spray device.

The pump for withdrawing the slurry stream from the tank, and the pump for withdrawing slurry for consumption from the tank, may each be submersible pumps suspended in slurry in the tank, or, conveniently, may each be outside the tank having inlet pipes projecting downwardly into the slurry in the tank, in each case extending downwardly via the open top of the tank into the slurry, so that the mass of or pressure in the tank is essentially unaffected thereby, there being no direct physical connection between said pumps (or the their inlet pipes), and the tank walls of floor, particularly when load cells are employed. If desired, the inlet pipes to the pumps which project downwardly from the pipes into the slurry, may be replaced by flexible pipes or hoses connected to the tank, in which case it may be preferable to replace the load cells with pressure cells which function as described above.

If desired, the installation may be in the form of a portable apparatus. Thus, the reservoir and the associated slurry withdrawal means, volume control means and separate gravity control means may be of a size which permits them to be taken from site to site, where they are installed, on a vehicle such as a truck or lorry, and the support may, instead of being a concrete slab, be a container, such as a portable shipping container, having an open top to permit loading thereof, for example, with particulate material by means of a front end loader, and having a closeable slot at an end thereof from which drainage of slurry can take place if the container is mounted at an angle with the slot lowermost.

BRIEF DESCRIPTION OF THE DRAWINGS

The invention will now be described by way of example, with reference to the accompanying diagrammatic drawings, in which:

FIG. 1 is a schematic plan view of an installation according to the invention; and FIG. 2 is a schematic side elevation of the installation of FIG. 1.

In FIGS. 1 and 2 of the drawings the same reference numerals are used to designate the same parts, unless otherwise specified, and, in the drawings an installation for forming and maintaining a stock of slurry, in the form of a limestone or calcium carbonate slurry is generally designated by reference numeral 10.

DESCRIPTION OF THE PREFERRED EMBODIMENTS

The installation 10 comprises a concrete slab, generally designated 12, shown in FIG. 2 to be supporting a heap 14 of limestone powder. The slab 12 has a flat lower surface (not shown) resting on the ground surface and an upwardly facing support surface supporting the heap 14, the support surface being made up of two flat portions 16 (see in particular FIG. 1). The portions 16 shape and converge downwardly from uppermost ridges 18 to meet at a line of intersection 20 therebetween. The ridges 18 meet at a position 22 which is at the uppermost end of the line of intersection 20, the line of intersection sloping downwardly from an upper end thereof at the position 22, to a lower end thereof at 24, at the level of the ground 26. The line of intersection 20 defines the bottom of a drainage channel formed in the support surface of the slab 12 by and between the portions 16 which drains, downwardly from position 22 to position 24, position 24 forming a drainage point where the slab 12 finally drains.

The slab has a pair of ramps 28 sloping upwardly from the level of the ground 26 respectively to the ridges 18. The ridges 18 are horizontal and the ramps 28 are flat and slope at an angle of 13° to the horizontal, upwardly from ground level to their respective ridges 18, which are 1.14 m above ground level and are each 12.02 m long. The line of intersection 20 is 13.05 m long.

The portions 16 of the support surface of the slab 12 each have a short edge 30 sloping downwardly from an upper end thereof, at a position 31 which is 0.35 m above the ground, towards the line of intersection 20, which they meet at the position 24 Each portion 16 further has an edge 32 sloping upwardly from the associated position 31 to the adjacent end of the associated ridge 18. Each edge 32 has a 0.3 m high wall (broken lines at 33 in FIG. 2) extending along its length. The ground level periphery of the slab 12 is made up of the lower edges 34 of the ramps 28, the lower edge 36 of a triangular face 37 on the slab 12 whose corners are at the adjacent ends of the edges 34 and the position 22, and edges 38 of quadrangular faces 39 of the slab 12. The edges 32 of the faces 39 are at an included acute angle A of 7.1° to the edges 38 of said faces 39. Each face 39 has its corners respectively at opposite ends of its edge 38, at the associated position 31 and at the end of its edge 32 remote from the position 31. While the face 37 in fact slopes upwardly and inwardly from its edge 36 to the position 22, the faces 39 are vertical, the end of each ridge 18 remote from the position 22 being directly above the associated edge 38. The ramps 28 are elongate rectangular in outline having end edges joining the edges 18, 34 thereof, the end edges being 5.06 m in length, the edge 36 in turn being 6.97 m long and each edge 32 being 12.09 m long, while each edge 38 is 16.93 m long.

Adjacent the edges 30 of the portions 16 of the upwardly facing support surface of the slab 12 is a pit 40 in the ground 26 (the pit 40 not being shown in FIG. 1). In the illustrated pit an open topped tank 42 is mounted on a pair of load cells 44. The tank 42 contains a stirrer 46 (not shown in FIG. 1) and a valve, such as the illustrated float controlled inlet valve 48, is suspended in the top of the tank 42 at the end of a water supply line 50. A drainage line 52 is shown feeding from the lower end 24 of the line 20 of intersection 20 of the slab 12 into the tank 42, the line 52 being defined by a pipe 54 (not shown in FIG. 1).

A flow line defined by a pipe 56 extending downwardly into the tank 42 via its open top leads to a pump 58 which feeds into a hose 60 having a spray nozzle at its end remote from the pump 58. Similarly a flow line defined by a pipe 64 extending downwardly into the tank 42 via its open top leads to a pump 66 which feeds Into a pipe 68 leading to a container/aeration tank 70 of an acid water neutralization plant, the tank 70 being shown feeding via a line 72 into a thickener 74.

In a variation of the slab 12 (which is not drawn to scale in FIGS. 1 and 2), the dimensions are somewhat different. Thus, in the variation the ridges 18 are 12.03 m long, the line of intersection 20 being 13.09 m long, while the ramps 28 remain inclined at 13° to the horizontal. The ridges 18 are 1.5–1.6 m above the flat bottom of the slab and the position 31 is 0.4–0.5 m above the bottom of the slab. Edge 32 of face 39 is 6.41 m in length and edge 38 is 7.63 m in length, angle A being 8.5° Face 37 has its edge 36 1.83 m long and the short edges of the ramps 28 interconnecting the ends of the edges 34 and the ends of the ridges 18, are 1.33 m in length. In use it is intended that this variation of the slab be partially embedded in the ground, with its flat lower surface horizontal and 1.07 m below ground level, and its ridges 18 horizontal and 0.3 m above ground level. Edges 32 of faces 39 will in this case be provided with walls having horizontal upper edges which project 0.5 m above ground level; and the top of the tank 42 will be sufficiently sunken below ground level to permit drainage from position 24 on the slab into the open top of the tank 42. In a yet further variation, if it is desired, for example, to have the tank 42 on and above the ground to avoid the need for a pit 40 (see FIG. 2) either of the slabs 12 described above can be raised above ground level on a platform or plinth, in which case loading of the slab 12 can, instead of being by means of a tipper truck as described hereunder for FIGS. 1 and 2, be by means of a front end loader. Finally, with regard to the slab 12, it need not be entirely solid, and its lower surface need not be flat, the slab, for example having downwardly facing cavities or indentations to effect a saving of concrete.

Figure 2:
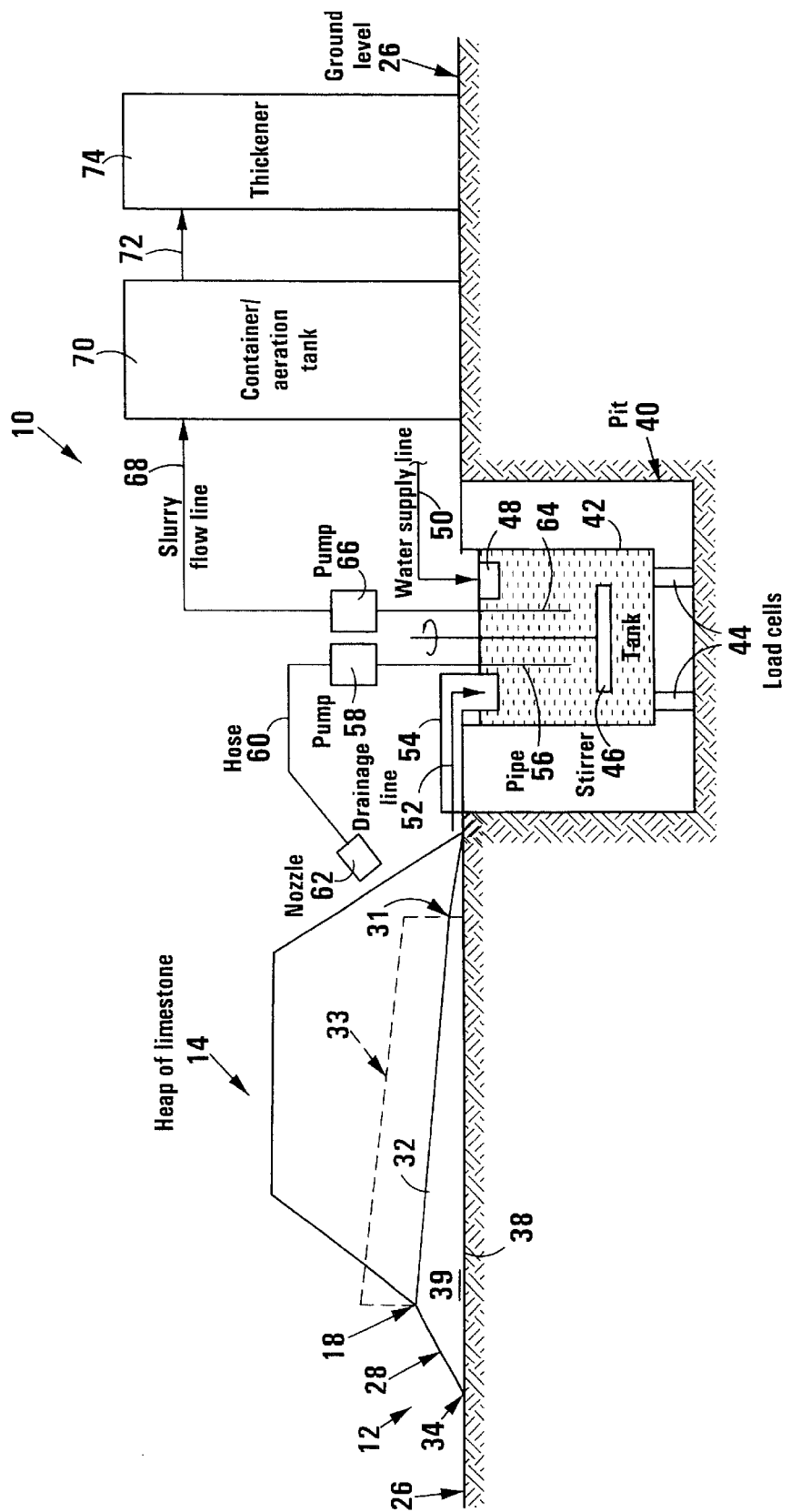

In accordance with the method of the present invention, and with reference to FIGS. 1 and 2 of the drawings, at start-up, one or more loads of calcium carbonate may be loaded on to the upwardly facing support surface constituted by the portions 16 of the upper surface of the slab 12. This is conveniently carried out by tipper trucks, which can reverse up either of the ramps 28 prior to tipping, so as to tip on to the portions 16, to form the heap 14 (FIG. 2) of calcium carbonate there The tank 42 can, at the same time, be at least partially filled with water, from the water supply line or pipe Then, the pump 58 is used to pump water from the tank 42 along the pipe 56 and hose 80 to the nozzle 62, and the nozzle 52 is directed by hand at and on to the calcium carbonate of the heap 14, above or adjacent the position 24 at the lower end of the channel defined by the line of intersection 20 between the portions 16. A slurry of calcium carbonate is formed, which is washed towards said position 24, the slurry then draining in the direction of flow line 52 along the pipe 54 (FIG. 2) into the open top of the tank 42 In this way a starting charge or load of slurry can be charged into the tank 42, up to a desired level or depth, which can be determined by the float-controlled valve 48 which admits water into the tank 42 from the pipe 50.

Thereafter, after start-up, slurry for consumption is pumped by pump 66 along fines 64 and 68 and line 72 in series to the conditioner/aeration tank 70 and thickener 74, as required. As soon as such pumping for consumption takes place, the float-controlled valve 48 will open, to admit further water into the tank 42 from flow line 50. The load cells 44 on which the tank 42 is mounted measure the mass of the tank 42 and it slurry contents. In this regard it is to be noted that the pipe 54, the stirrer 46 which is employed to keep the contents of the tank 42 agitated and to resist settling of solids from the slurry, and the pipes 50, 56 and 64 and the float-controlled valve 48, are not connected to the tank 42, but are merely suspended to project downwardly into its interior, into the slurry in the tank 42. The thus do not contribute to the mass of the tank 42 and its contents, as measured by the load cells 44.

As slurry for consumption is withdrawn by pump 66 and water is admitted from pipe 50 via float-controlled valve 48, the specific gravity of the slurry in the tank 42 progressively decreases, until it falls below a desired level (unless it was already below the desired specific gravity value at start-up). If the specific gravity is, or as soon as its falls below this desired level, the load cells 44 automatically cause operation of the pump 58 to spray slurry from the nozzle 62 on to the heap 14. This washes additional calcium carbonate from the heap into the tank 42 along line 52, thereby raising the specific gravity of the slurry in the tank 42, until it exceeds said desired level, at which stage the load cells 44 switch off the pump 58.

From time to time the calcium carbonate on the heap 14 is replenished from tipper trucks, and in this fashion a full charge of slurry of the appropriate specific gravity is maintained in the tank 42, for consumption as and when desired, in the conditioning/aeration tank 70 and thickener 74.

The method as described above will involve intervention by an operator from time to time to tip calcium carbonate on to the slab 12, and to direct the hand-held hose 60 and nozzle 62 at appropriate parts of the heap 14. Naturally, however, if increased automation is desired, several hoses 60 may be provided with nozzles 60 which are either directed in fixed attitudes and in fixed positions at different parts of the heap 14, or which are moved automatically and mechanically when the pump 58 is operative, to lay down a desired spray pattern on the calcium carbonate of the heap 14. Thus the calcium carbonate can be progressively entrained in the circulating slurry, and is washed into the tank 42 in a fashion such that, if the calcium carbonate of the heap 14 is not replenished, it will eventually all be washed into the tank 42.

It should be noted that the capacity of pump 58, and the capacity of the water supply along pipe 50, should be selected so that the slurry level in the tank 42 can be maintained at the desired level even if the pump 66 is operated continuously, and so that the solids concentration and specific gravity of the slurry can also be maintained at the desired level, in the event of such continuous pump operation.

It is an advantage of the invention that it provides a method and installation for forming and maintaining a stock of slurry in the tank 42, for example a water/calcium carbonate slurry, in a easily applied automated or semi-automated fashion.

What is claimed is:

1. A method of forming and maintaining for consumption a stock of a slurry derived from a liquid and from a particulate solid material, the method including the steps of:

withdrawing the slurry of the liquid and the solid material from the stock of the slurry in a reservoir;

directing a stream of additional said liquid or of the withdrawn slurry at a bulk supply of additional said solid material in the form of a heap of the solid material, and on to the solid material of the heap;

allowing the stream directed at the heap to drain under gravity from the heap into the reservoir, the stream, while draining from the heap, entraining therein the additional solid material from the heap to increase the specific gravity of the stream and to carry said additional solid material from the heap into the stock of the slurry in the reservoir to increase the specific gravity of the stock of the slurry in the reservoir; and feeding additional said liquid to the reservoir to maintain the volume of the slurry in the reservoir, the method including controlling both the volume of the slurry in the reservoir and the specific gravity of the slurry in the reservoir, the feeding of the additional liquid into the reservoir being initiated, or the feed rate of the additional liquid being increased, in response to decreases in the volume of the slurry in the reservoir associated with the withdrawal of the slurry from the reservoir for consumption of the slurry, and the directing of the stream at the heap of the solid material being initiated, or the flow rate of the stream being increased, in response to decreases in the specific gravity of the slurry in the reservoir associated with the feeding of the additional liquid to the reservoir, thereby both to maintain the volume of the slurry in the reservoir at a desired value, and to maintain the specific gravity of the slurry in the reservoir at a desired value, the feeding of the additional liquid to the reservoir being reduced in rate or discontinued when the desired slurry volume is regained, and the directing of the stream at the heap being reduced in rate or discontinued when the desired specific gravity value is regained.

2. A method as claimed in claim 1, in which the stream directed at the heap is a stream of the slurry withdrawn from the reservoir.

3. A method as claimed in claim 2, in which the additional liquid feed to the reservoir is intermittent and is at a fixed rate no less than the maximum rate at which the slurry is withdrawn from the reservoir for consumption, the stream directed at the heap being withdrawn from the reservoir intermittently and at a fixed rate.

4. A method as claimed in claim 1, in which the liquid is water, the solid material being selected from the group consisting of limestone, dolomite and mixtures thereof.

5. A method as claimed in claim 1, in which the controlling of the volume of slurry in the reservoir is automatic, being by controlling the depth of the slurry in the reservoir by means of a valve, the valve controlling the additional liquid feed to the reservoir.

6. The method of claim 5, wherein the valve is selected from the group consisting of ultra-violet (UV)-controlled valves and float-controlled valves.

7. The method of claim 6, wherein the valve is a float-controlled valve.

8. A method as claimed in claim 1, in which the controlling of the specific gravity of the slurry in the reservoir is automatic, being by using a cell to control the directing of the stream at the heap.

9. The method of claim 8, wherein the cell is selected from the group consisting of load cells which measure the mass of the reservoir and pressure cells which measure static pressure in the reservoir.

10. The method of claim 9, wherein the cell is a load cell.

11. A method as claimed in claim 1, which includes the step of agitating the slurry in the reservoir to promote maintenance of the solid material in suspension in the liquid, the withdrawal of the slurry from the reservoir being by pumping, the directing of the stream at the heap being by spraying the stream from at least one hand- held nozzle, and the feeding of the liquid to the reservoir being by directing the liquid at the heap.

12. An installation for forming and maintaining, for consumption, a stock of a slurry derived from a liquid and from a bulk supply of a particulate solid material, the installation including:

a support having an upwardly facing support surface for supporting a heap of the particulate solid material, the support surface sloping so that the support surface is inclined to the horizontal to permit a said slurry of the liquid and of the particulate solid material to drain under gravity from the support surface;

a reservoir arranged to receive the slurry draining under gravity from the support surface of the support and to hold a said stock of slurry;

a liquid feed for feeding additional said liquid to the reservoir;

a slurry withdrawal device for withdrawing the slurry from the stock of slurry in the reservoir;

a spray device for spraying additional said liquid or said slurry at a said heap of particulate material supported on the support and on to the particulate material of the heap;

a volume control device for controlling the volume of the stock of slurry in the reservoir and operative, in response to a decrease in said volume below a desired value, to initiate, or to increase the rate of, the feeding of the additional liquid by the liquid feed to the reservoir; and a specific gravity control device for controlling the specific gravity of the stock of the slurry in the reservoir and operative, in response to a decrease in said specific gravity below a desired value, to initiate, or to increase the rate of, the spraying of the additional liquid or of the slurry at the heap, the volume control device being operative to discontinue, or to reduce the rate of the feeding of the additional liquid to the reservoir, when the desired volume is regained and the specific gravity control device being operative to discontinue, or to reduce the rate of, the spraying of the additional liquid or the slurry at the heap, when the desired specific gravity is regained.

13. An installation as claimed in claim 12, in which the support is a slab of cementitious material having a shaped said support surface for supporting the heap, the support surface sloping downwardly to a drainage point and the slab being provided with a vehicle ramp leading upwardly from ground level to a peripheral edge of the slab, which edge is raised above ground level, the reservoir being a tank located below the level of the drainage point and provided with a stirrer in its interior.

14. An installation as claimed in claim 12, in which the slurry withdrawal device is a pump.

15. An installation as claimed in claim 12, in which the spray device comprises at least one hose having a free end provided with a spray nozzle.

16. An installation as claimed in claim 12, in which the volume control device is a shut-off valve, the shut-off valve being arranged to open if the level of slurry in the reservoir decreases below a desired value and to close when said desired value is regained.

17. An installation as claimed in claim 16, wherein the valve is selected from the group consisting of ultra-violet (UV)-controlled valves and float-controlled valves.

18. An installation as claimed in claim 17, wherein the valve is a float-controlled valve.

19. An installation as claimed in claim 12, in which the specific gravity control device comprises at least one cell, the cell being operatively connected to a shut-off valve for supplying the additional liquid or the slurry to the spray device.

20. An installation as claimed in claim 19, wherein the valve is selected from the group consisting of load cells which the reservoir is supported for sensing the mass of the reservoir, and pressure cells in the interior of the reservoir for sensing static pressure in the reservoir.

21. An installation as claimed in claim 20, wherein the cell is a load cell.

\* \* \* \* \*

UNITED STATES PATENT AND TRADEMARK OFFICE
CERTIFICATE OF CORRECTION

PATENT NO. : 6,592,246 B2
DATED : July 15, 2003
INVENTOR(S) : Maree

It is certified that error appears in the above-identified patent and that said Letters Patent is hereby corrected as shown below:

<u>Title page,</u>
Item [57], ABSTRACT,
Line 9, "therefrom A reservoir" should read -- therefrom. A reservoir --.

<u>Column 3,</u>
Line 1, "therewith Withdrawal" should read -- therewith. Withdrawal --.
Line 34, "reservoir" should read -- reservoir. --.
Line 39, "including;" should read -- including: --.

<u>Column 4,</u>
Line 34, "Into" should read -- into --.
Line 64, "regained" should read -- regained. --.

<u>Column 6,</u>
Line 59, "24 Each" should read -- 24. Each --.

<u>Column 7,</u>
Line 30, "Into" should read -- into --.
Line 42, "8.5°" should read -- 8.5°. --.

<u>Column 8,</u>
Line 5, "there" should read -- there. --.
Line 6, "pipe" should read -- pipe 50. --.
Line 14, "tank 42" should read -- tank 42. --.
Line 21, "fines" should read -- lines --.

<u>Column 10,</u>
Line 24, "hand- held" should read -- hand-held --.

<u>Column 12,</u>
Lines 11-12, "the valve is" should read -- the cell is --.

UNITED STATES PATENT AND TRADEMARK OFFICE
CERTIFICATE OF CORRECTION

PATENT NO.    : 6,592,246 B2
DATED         : July 15, 2003
INVENTOR(S)   : Maree It is certified that error appears in the above-identified patent and that said Letters Patent is hereby corrected as shown below:

Column 12 (cont'd),
Lines 12-13, "cells which" should read -- cells on which --.

Signed and Sealed this

Seventh Day of September, 2004

JON W. DUDAS
*Director of the United States Patent and Trademark Office*